Dec. 2, 1952 C. E. NAGY 2,620,407

SPRING-HELD INDEX CARD ATTACHMENT FOR TELEPHONES

Filed April 25, 1950 2 SHEETS—SHEET 1

Charles E. Nagy
INVENTOR.
BY Clarence A. O'Brien
and Harvey B. Jacobson
Attorneys Dec. 2, 1952 C. E. NAGY 2,620,407

SPRING-HELD INDEX CARD ATTACHMENT FOR TELEPHONES

Filed April 25, 1950 2 SHEETS—SHEET 2

Charles E. Nagy
INVENTOR.

BY Clarence A. O'Brien
and Harvey B. Jacobson
Attorneys

Patented Dec. 2, 1952

2,620,407

UNITED STATES PATENT OFFICE 2,620,407

SPRING-HELD INDEX CARD ATTACHMENT FOR TELEPHONES

Charles E. Nagy, Newark, Ohio

Application April 25, 1950, Serial No. 158,031

2 Claims. (Cl. 179—178)

This invention relates to an attachment for a telephone, and more particularly to a memorandum bracket for telephones of the cradle or French type having a recess or hand hold therein for carrying the telephone from one location to another.

An object of this invention is to provide an index card attachment for French or cradle type telephones having finger or hand holds for carrying the telephone from one location to another, which attachment includes a bracket which is readily attached to the telephone and securely held thereon by spring clips.

A further and more particular object of the invention is to provide a bracket adapted to support an index card case or other suitable device which may be molded from suitable plastic material, preferably those of thermo-setting characteristics, and which employs spring clips engageable with an overhanging projection of the hand hold to securely hold the bracket in place.

Still further objects of the invention reside in the provision of a bracket for securing a memo pad or the like to a telephone, which bracket is strong, durable, highly attractive in appearance, simple in construction and design, capable of being readily and easily installed on conventional existing telephones, and which is relatively inexpensive to manufacture.

Other objects reside in the provision of this index card attachment for a telephone which may be readily and easily manufactured by molding, these objects becoming apparent as the following description proceeds.

The preferred embodiments of this index card attachment for a telephone have been illustrated in the accompanying drawings, by way of example only, wherein.

Figure 1:
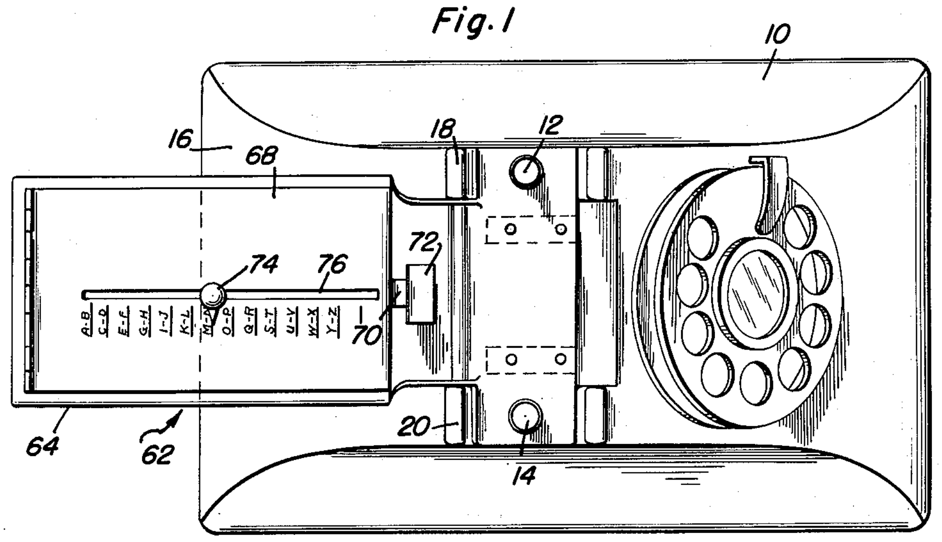
Figure 1 is a top plan view of the invention showing it in emplacement on a telephone of the French type having a hand hold or recess therein.
Figure 2:
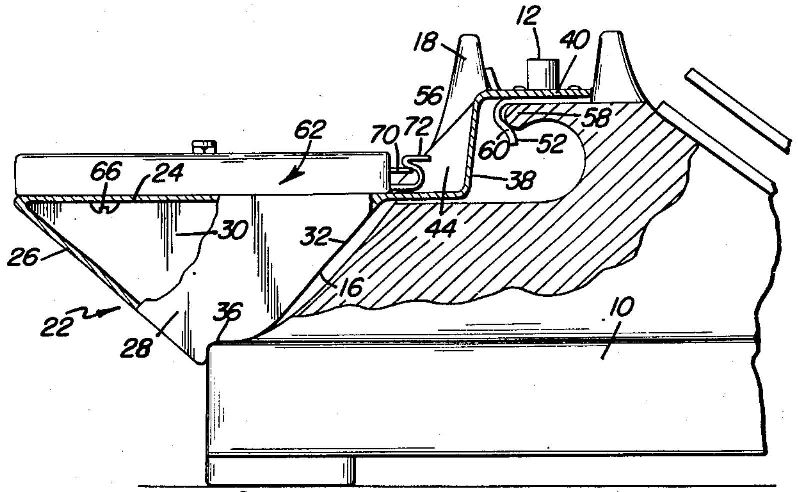
Figure 2 is a side elevational view of the invention showing it emplaced on a telephone with parts thereof being broken away to show other parts in greater detail.
Figure 3:
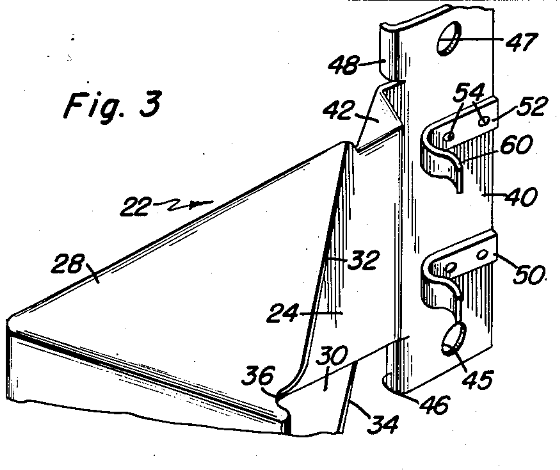
Figure 3 is a perspective view of the bracket comprising the major element of the present invention.

With continued reference to the accompanying drawings, wherein like reference numerals designate similar parts throughout the various views, 10 generally designates a French or cradle type telephone which includes a pair of contacts 12 and 14, a slanting surface 16, and a pair of parallel extending ridges 18 and 20 within which the bracket generally designated by reference numeral 22 may be emplaced.

The bracket 22 is preferably formed from a suitable plastic material such as a thermo-setting resin or the like, though it may be made from a single sheet of material such as steel or aluminum. The bracket includes an upper plate 24 preferably integrally formed with a lower plate 26. Attached to the side edges of the upper plate 24 and the lower plate 26 are side plates 28 and 30 each of which is provided with a slanting edge 32 and 34, respectively, adapted to abut and engage the slanting surface 16 of the telephone. Lips 36 are formed in each of the side members 28 and 30 and are adapted to engage the edge of the rear wall of the telephone 10. The bottom plate 26 has its lower edge in abutting engagement with the rear wall of the telephone in order to securely maintain the bracket in proper position. Integrally formed with and upwardly extending from the upper plate 24 is a riser portion 38 to which there is integrally attached a vertically displaced member 40. Side walls 42 and 44 are integrally formed with the riser portion 38 and the upper plate 24 and strengthen the entire assembly.

The vertically displaced member 40 is provided with apertures 45 and 47. The contacts 12 and 14 are adapted to extend through the apertures 45 and 47, respectively. The plate 40 is further provided with ears 46 and 48 for engagement with the ridges 18 and 20 so as to further maintain the device in secure engagement with the telephone. Spring clips 50 and 52 are either attached to the plate 40 by suitable rivets 54 or the like, or else are integrally molded with the member 40 and the other portions of the bracket. The spring clips 50 and 52 are either made from spring steel or the like, or are formed from the same plastic material as the bracket 22. The springs 52 are of such configuration as to provide a clearance, as at 56, from the overhanging portion 58 of the telephone so as to enable a portion 60 to resiliently engage another portion of the overhang 58.

The bracket 22 is adapted to be placed on the telephone with the member 40 overlying the cradle of the receiver with the receiver contacts 12 and 14 encompassed by the portion of the member 40 surrounding the apertures 45 and 47. The ears 46 and 48 will abut against the ridges 18 and 20 and the lip 36 will engage the upper edge of the rear wall of the telephone so as to securely hold the bracket in place.

While the upper plate 24 of the bracket 22 is ideally adapted to support tumblers or the like, cigarettes, cigars, or ash trays, it is within the concept of the invention to provide a plurality of apertures in the upper surface in order to attach a memo pad, generally indicated at 62, thereon. This index card or memo pad 62 comprises a container 64 that is secured by bolts or the like to the bracket 22 through the apertures in the upper plate 24. Bolts are generally indicated as at 66. A cover 68 which is spring urged to its open position is pivotally secured to the container 64. The cover is provided with a projection 70 which is selectively engaged by a trigger 72. Thus, the cover 68 can be released by merely pressing down on the trigger 72. A retainer type marker 74 is mounted in a slot 76 in the cover 68 and is adapted to both indicate a certain card in the file and hold that card down from being rotated upwardly with the container cover. Further, the structure of this memo pad can be readily understood upon inspection of the copending application, Serial No. 115,575, filed September 14, 1949.

Figures 4, 5:
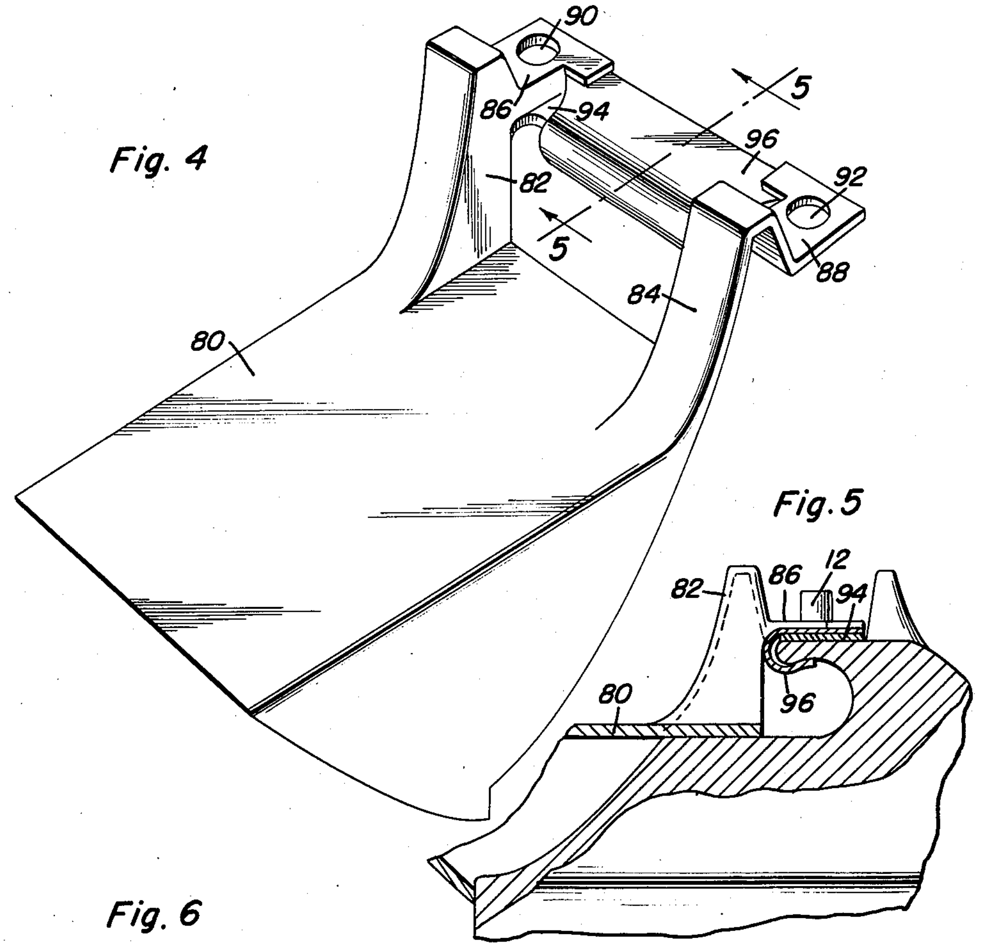
Figure 4 is a perspective view of another form of index card attachment which is held by spring means in engagement with a telephone of the French or cradle type.
Figure 5 is a vertical sectional detail as taken along line 5—5 in Figure 4.

Referring now to Figures 4 and 5, wherein there is shown another form of the invention, it will be seen that upwardly extending from an upper plate 80 are vertically displaced members 82 and 84 which are adapted to overlie the pair of parallel extending ridges 18 and 20 of a telephone, and to which there are attached portions 86 and 88 which form part of the vertically displaced members and which are provided with apertures 90 and 92 through which the contact members 12 and 14 of the telephone are adapted to extend. Extending between the members 82 and 84 is a plate 94 and carried between the plate 94 and the elements 86 and 88 is a spring clip 96 for engagement with the telephone, as can be best seen in Figure 5.

Figure 6:
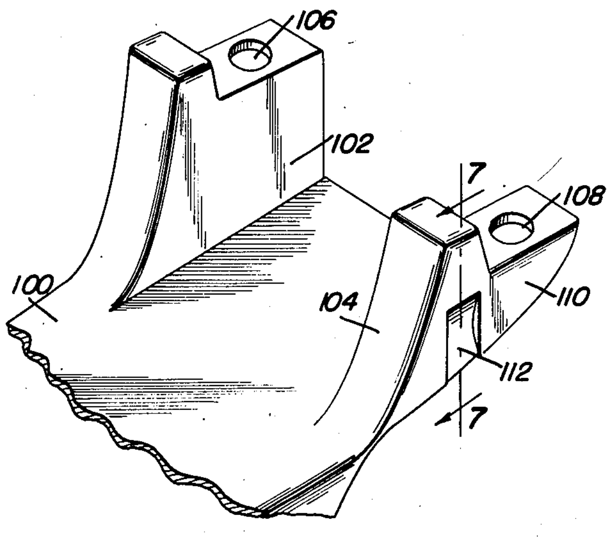
Figure 6 is a perspective detail of another form of the invention.
Figure 7:
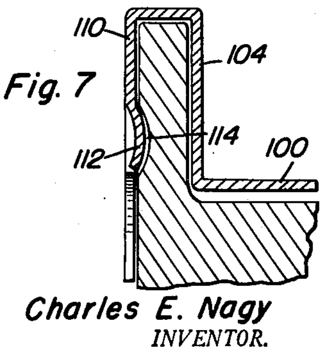
Figure 7 is a vertical sectional detail of a portion of the modified form of the invention as shown in Figure 6 and as taken along line 7—7 therein.

Referring now to Figures 6 and 7, there is shown a third embodiment of the invention which includes an upper plate 100 from which extend vertically displaced members 102 and 104 which have apertures 106 and 108 therethrough, through which the contact members 12 and 14 can extend. Integrally formed with the side walls 110 of the vertically displaced portions 102 and 104 are detents 112 which form resilient clips for engaging within a recess 114 formed in some forms of telephones.

Since, from the foregoing, the construction and advantages of these spring-held index card attachments for telephones are readily apparent, further description is believed to be unnecessary.

However, since numerous modifications will readily occur to those skilled in the art after a consideration of the foregoing specification and accompanying drawings, it is not intended to limit the invention to the precise embodiments of spring-held index card attachments for telephones shown and described, but all suitable modifications and equivalents may be readly resorted to which fall within the scope of the appended claims.

Having described the invention, what is claimed as new is:

1. An attachment for telephones comprising a bracket having a horizontal upper plate and an inclined lower plate integrally formed therewith, side walls attached to the side edges of said upper and lower plates, said side walls being provided with lips for engaging the telephone subset, vertically displaced members attached to said upper plate and configurated to embrace the rear pair of parallel ridges of the subset, an extension portion integral with each of said members and having apertures therethrough through which contact members of a telephone are adapted to extend, a plate extending between said vertically displaced members and a clip secured between said plate and said vertically displaced members for resiliently engaging a telephone.

2. An attachment for telephones comprising a bracket having a horizontal upper plate and an inclined lower plate integrally formed therewith, side walls attached to the side edges of said upper and lower plates, said side walls being provided with lips for engaging the telephone subset, vertically displaced members attached to said upper plate and configurated to embrace the rear pair of parallel ridges of the subset, an extension portion integral with each of said members and having apertures therethrough through which contact members of a telephone are adapted to extend, and spring means forming part of said vertically displaced members for resiliently engaging a telephone.

CHARLES E. NAGY.

REFERENCES CITED

The following references are of record in the file of this patent:

UNITED STATES PATENTS

| Number | Name | Date |
|---|---|---|
| D. 164,173 | Ives | Aug. 7, 1951 |
| 873,259 | Napp | Dec. 10, 1907 |
| 2,259,148 | Burkhart | Oct. 14, 1941 |
| 2,271,140 | Kelley | Jan. 27, 1942 |
| 2,320,838 | Watson | June 1, 1943 |
| 2,442,988 | Satz | June 8, 1948 |
| 2,473,775 | Allen et al. | June 21, 1949 |
| 2,500,838 | Le Vine | Mar. 14, 1950 |
| 2,516,676 | Caroselli | July 25, 1950 |
| 2,518,554 | Kirby et al. | Aug. 15, 1950 |